United States Patent Office 3,505,268
Patented Apr. 7, 1970

---

3,505,268
POLYMERIC DISPERSANT
Margaret Peddie Backhouse, Ascot, Ferenc Karoly Farkas, Maidenhead, and George Reginald Cornish, Slough, England, assignors to Imperial Chemical Industries Limited, London, England, a corporation of Great Britain
No Drawing. Filed July 28, 1966, Ser. No. 568,378
Claims priority, application Great Britain, Aug. 4, 1965, 33,353/65
Int. Cl. C08f 47/19, 47/20
U.S. Cl. 260—31.2
5 Claims

---

ABSTRACT OF THE DISCLOSURE

A dispersant for use in dispersions in organic media, the dispersant being soluble in the organic media and having the formula:

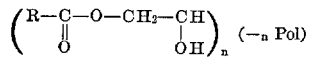

where R is an aliphatic radical which contains at least one hydroxyl group, Pol is an addition polymer chain which is solvated by the organic media and $n$ is the number of groups having the formula

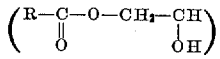

attached to the group ($-_n$ Pol) and is at least one. The dispersant is used in organic continuous phase, the polymer chain component of the dispersant being solvated by the organic continuous phase and being attached to disperse pigment particles by the group

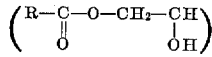

---

This invention relates to dispersants for use in dispersions of liquid or solid particles in an organic medium, to processes of making such dispersants, and to dispersions in organic medium containing such dispersants.

According to this invention we provide a dispersant for use in dispersions in organic media, the dispersant being soluble in the organic media and having the formula:

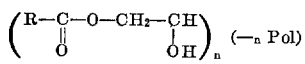

where R is an aliphatic radical which contains at least one hydroxyl group, Pol is an addition polymer chain which is solvated by the organic media and $n$ is the number of groups having the formula

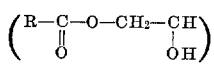

attached to the group ($-_n$ Pol) and is at least one.

The term "solvatable" as applied in this specification to the chain-like addition polymer implies that the polymer is soluble in the organic medium where the medium is a liquid and compatible with the medium where the medium is a polymeric solid. Generally, in order to achieve this objective the polarities of the organic medium and the polymer chain of the dispersant solvated thereby must be similar. For example, for use in an organic medium which is a nonpolar liquid the polymer chain to be solvated generally must also be nonpolar; for use in a polar medium the polymer chain generally must also be polar. In general, the polarity of the polymer chain will depend on the nature of the other atoms or groups attached to its basic chain structure and consequently the polarity and therefore the solvatability of the polymer may be varied by selection of appropriate monomers from which to form it. Where the organic medium is nonpolar, e.g., a liquid aliphatic hydrocarbon, the following are examples of suitable dispersant polymer chains which can be solvated:

Polymers of long chain esters of acrylic, methacrylic or ethacrylic acid, e.g., stearyl, lauryl, octyl, 2-ethyl hexyl and hexyl esters of acrylic or methacrylic acid; polymeric vinyl esters of long chain acids, e.g., vinyl stearate, vinyl laurate and vinyl octoate; polymeric vinyl alkyl ethers; and Polymers of unsaturated hydrocarbons, such as ethylene, propylene, isobutylene and isoprene.

Where the organic medium is a liquid which is mainly aromatic hydrocarbon in nature, similar dispersant chains may be used and, in addition, shorter chain analogues, e.g., polymers of ethoxyethyl methacrylate, methyl methacrylate and ethyl acrylate. Also:

Polymers of styrene and substituted styrenes, such as vinyl voluene and α-methyl styrene;

Polymers of alkylene oxides, such as ethylene, propylene, butylene and hexylene oxides;

Polymers of vinyl alkyl ethers, such as vinyl methyl ether and vinyl ethyl ether; and Lower polymers of vinyl halides and vinyl esters, such as vinyl chloride and vinyl acetate, can be solvated by such an organic liquid.

Where the organic medium is a liquid which is highly polar in nature, e.g., ketones, esters and alcohols, suitable dispersant chains which can be solvated by the liquid include:

Polymers of styrenes, alkylene oxides, vinyl alkyl ethers, vinyl halides and vinyl esters as mentioned above;

Polymers of acrylic and methacrylic acid and amides and short chain esters thereof;

Polyethylene and polypropylene glycols;

Hydroxylated polymers, e.g., polyvinyl alcohol; and

Polymers of glycol mono-methacrylates and acrylates.

The term "polymers" as used above includes copolymers and these may be random or graft copolymers.

These examples listed above are merely illustrative of the principle to be followed in selecting a polymer chain which will be solvated by the particular organic liquid in which the dispersant is used, i.e., the principle that the dispersant chain to be solvated must be of similar polarity to that of the organic liquid.

Similar considerations apply in the case of solid polymeric organic media, though here the choice is more limited and generally it is preferred to use a polymeric dispersant component the polymer chains of which are similar or closely related in composition to those of the medium. There are exceptions to this generality; for example, polymethyl methacrylate and polyvinyl chloride are compatible over a wide range of proportions, so a dispersant suitable for use in a polyvinyl chloride medium may contain polymethyl methacrylate chains and vice versa.

Polymeric organic solids usually are of high molecular weight, e.g., more than 100,000, and in many cases the solvated polymer chain of the dispersant used therein needs to be of a comparable molecular weight in order to avoid degradation of the properties of the solid. In the case of dispersions in organic liquids the solvated polymer chain is usually of molecular weight less than 100,000. Higher molecular weights are not preferred, chiefly because of the much higher weight proportion of the dispersant which would be required.

Another essential feature of the dispersant is that it contains one or more groups of the above-defined formula which are attracted to the surface of disperse particles and serve to anchor the solvated addition polymer chain thereto.

The ester link in the above-defined group is of the type produced for example by reacting a carboxyl group with an epoxide group in that the opening of the epoxy ring results not only in an ester link to one carbon atom but also the production of a hydroxyl group on an adjacent carbon atom.

Another feature of the above-defined group is that it contains linked to the solvatable polymer chain through the ester link, an hydroxyl-substituted aliphatic group. In the above-defined formula the hydroxyl group adjacent to the ester linkage may be formed by reacting hydroxyl-substituted aliphatic carboxylic acid with an epoxide group attached to or subsequently attached to the chain-like component.

Suitable hydroxy acids include hydroxy-substituted saturated and unsaturated acids containing up to 20 or more carbon atoms. The carbon chain of the acid may be straight or branched and the hydroxyl group attached thereto as shown in the above formula may be primary, secondary or tertiary. The aliphatic radical R may contain one or more hydroxyl groups additional to the one shown attached to it in the above formula. For example, suitable hydroxy-substituted aliphatic acids include lactic, glycollic, gluconic, hydroxy-valeric, 12-hydroxy-stearic, dihydroxy-stearic, ricinoleic, 2,3-dihydroxy butyric, 3,4,5-trihydroxy hexanoic, 2-hydroxy methyl nonanoic, 2-hydroxy-3 methyl butyric, 2-hydroxy-2,2-dipropyl acetic, and hydroxy pelargonic. Polyhydroxy-substituted aliphatic acids such as those occurring in shellac, e.g., aleuritic acid, may also be used. In such cases the acid may be extracted from the resin or the resin itself used in the manufacture of the dispersant.

Epoxide groups may be introduced into the polymer chain component by copolymerising an epoxide-bearing monomer with a suitable proportion of another monomer or monomers to form the polymer. Suitable epoxide-bearing monomers are glycidyl acrylate, glycidyl methacrylate and allyl glycidyl ether. Alternatively, polymer chains having a terminal epoxide group may be made by a process as described in patent application Ser. No. 367,883, now U.S. Patent No. 3,390,206. For example, a carboxyl-terminated polymer chain may be made by polymerising ethylenically unsaturated monomer using $\gamma,\gamma'$-azobis-($\gamma$-cyanovaleric acid) as initiator and thio-glycollic acid as chain transfer agent, the carboxyl group then being reacted with epichlorohydrin.

Another method of providing the adjacent hydroxyl group is to react a carboxyl group attached to the polymer chain component with an ester of the aliphatic acid containing an epoxide group adjacent the ester linkage, e.g., a glycidyl ester of the aliphatic acid.

In making the dispersants of this invention the ester link and adjacent hydroxyl group of the above-defined formula may be formed by reacting a carboxyl group and an epoxide group at a temperature of 100–150° C. in the presence of a catalyst, e.g., a tertiary aliphatic amine catalyst, preferably an alkyl dimethylamine and more preferably such an amine in which the alkyl group contains at least eight carbon atoms. Preferably the amine catalyst is used in a proportion of from 0.05 to 0.15% by weight of the reaction mixture.

The dispersants of this invention may contain more than one of the defined groups per molecule. This possibility arises in the case where the solvatable polymer chain component is an addition copolymer, one co-monomer of which contains a reactive group by means of which the defined groups may be provided on the chain to form the dispersant. In random copolymers of this type the defined groups may be attached at several points along the length of the random polymer chain. In an alternative embodiment the copolymer may be a block or graft copolymer in which the defined groups are confined to one segment of the copolymer, another segment or segments of the copolymer providing the solvatable polymer chain component.

According to this invention we also provide dispersions of a solid or liquid disperse phase in an organic continuous phase in which a dispersant of the above-described formula is present, the polymer chain components of the dispersant being solvated by the organic continuous phase and being attached to the disperse particles by the above-defined groups.

The invention is of particular value in improving dispersions of pigments, pesticides, blowing agents, metallic powders, solid polymer particles, such as polyvinyl chloride, polyvinyl acetate, polyvinylidene chloride, polyethylene, polypropylene and polyacrylonitrile and liquid particles of insoluble low molecular weight polymers. The particles may be dispersed in the organic continuous phase by a grinding, milling, emulsification, precipitation, or other technique. The dispersant may be added to the medium in which the particles are to be dispersed or the particles may be pretreated with the dispersant. The invention is of particular value in improving dispersion of pigments in coating compositions and in moulded and extruded plastics.

The proportion of dispersant to be used will depend on such factors as the disperse phase content and particle size of the dispersion, the size of the polymer chain component of the dispersant and the number of above-defined groups attached to the polymer chain component, and may range from as low as 0.1% to 200% or higher by weight of the disperse phase.

The use of dispersants of this invention can lead to an increase in the volume of material which can be dispersed in the organic medium, or to an improvement in the flow properties of dispersions in organic liquids, or to an increase in the rate of dispersion of the material in the medium. In one particular type of dispersion, i.e., dispersions of pigments in paints, the use of the dispersants can lead to improved gloss, colour values or opacity, and to reduced change in colour on storage of the paint.

When the dispersants are used in pigments paints in which the polymer chain component is solvated by the volatile organic liquid used to dissolve or disperse the film-forming component of the paint it is highly desirable that the polymer chain of the dispersant should be compatible with the film-forming component in the dry film of paint left when the volatile organic liquid of the paint has evaporated. In solution-type paints where the main film-forming component is an addition polymer it is preferable that the polymer chain of the dispersant be of the same type; the film-forming polymer is in solution in the volatile organic liquid of the paint and therefore the polymer chain component of the dispersant, being of the same type, will be readily solvated by the organic liquid of the paint. For example, where the main polymer is a polar acrylic polymer dissolved in a polar solvent then the polymer chain component of the dispersant is preferably also a polar acrylic polymer.

However, compatibility can be attained even when the film-forming component is not an addition polymer. For example, where the main film-forming polymer is an alkyd resin, optionally in combination with an amino resin such as melamine formaldehyde resin, dissolved in a relatively nonpolar liquid, then the solvatable polymer chain component of the dispersant used to assist dispersion of pigment therein is preferably non-polar addition polymer such as poly(lauryl methacrylate) or poly(vinyl stearate).

The invention is illustrated by the following examples in which all parts are by weight.

EXAMPLE 1

A methacrylate-based polymer soluble in aliphatic/aromatic hydrocarbon (boiling range 155° C. – 195° C.) was made in the following manner:

A mixture of—

| | Parts |
|---|---|
| Lauryl methacrylate monomer | 50.8 |
| Butyl methacrylate monomer | 231.0 |
| Glycidyl methacrylate monomer | 15.1 |
| Hydrocarbon (as above) | 242.0 |
| Aliphatic hydrocarbon (boiling range 70° C. – 90° C.) | 453.0 |
| Azodiisobutyronitrile | 5.36 | was heated with stirring to 86° C. – 88° C. and maintained at this temperature for 2 hours. At this stage a further 2.68 parts of axodiisobutyronitrile were added and heating continued for a further 2 hours.

332 parts of solvent were then removed by distillation and since much of this was the lower boiling solvent the reflux temperature rose to approximately 130° C. The solids content of the solution was 45.8%.

Epoxide groups in the polymer were then esterified in the following manner:

| | Parts |
|---|---|
| Polymer solution (45.8% solids) | 1,000.00 |
| Glycollic acid (66% purity) | 1.75 |
| Dimethyl dodecyl tertiary amine | 1.00 |

The mixture was heated with stirring to 130° C. and maintained at 130° C. – 140° C. until the acid value had fallen below 0.2 (acid value is defined as the number of milligrammes of potassium hydroxide required to neutralise 1 gramme of solid resin).

This esterified polymer was found to be a more effective dispersing agent than a conventional long oil-modified alkyd resin. For example, it was possible to disperse 43% more mono-azo yellow dyestuff pigment in the organic liquid containing the modified copolymer referred to above, than in an organic liquid containing a similar proportion of a long oil-modified alkyd.

EXAMPLE 2

Another methacrylate-based polymer soluble in aliphatic/aromatic hydrocarbon (boiling range 160° C. – 200° C.) was made in the following manner:

A mixture of—

| | Parts |
|---|---|
| Methyl ethyl ketone | 150 |
| Azodiisobutyronitrile | 18 | was stirred until a solution was formed and then added to a mixture of:

| | Parts |
|---|---|
| Lauryl methacrylate monomer | 480 |
| Butyl methacrylate monomer | 102 |
| Glycidyl methacrylate monomer | 18 |

This mixture was added dropwise over a period of 1½ hours to a stirred, refluxing mixture of the following solvents:

| | Parts |
|---|---|
| Hydrocarbon (as above) | 315 |
| Aliphatic hydrocarbon (boiling range 98° C.–122° C.) | 435 |

The entire mixture was then stirred at approximately 100° C. for a further 3 hours.

405 parts of solvent were then removed by distillation and the reflux temperature rose to approximately 130° C. The solids content of the solution was 55%.

Epoxide groups in the polymer were then esterified by mixing 1,000 parts of the polymer solution (55% solids) with 4.55 parts of lactic acid (75% purity) and 1 part of dimethyl dodecyl tertiary amine and heating, with stirring, to 110° C.–120° C. until the acid value had fallen below 0.2.

When a dispersion of vegetable black pigment was prepared by grinding it in a ball mill with white spirit containing 30% of a long oil-modified alkyd resin, the maximum proportion of pigment which could be satisfactorily dispersed was 11% by volume of the dispersion. When the organic liquid contained only 15% of the esterified polymer referred to above, vegetable black pigment was satisfactorily dispersed up to a pigment volume of 13.5% of the dispersion.

EXAMPLE 3

A methyl methacrylate/glycidyl methacrylate copolymer was prepared by polymerising a mixture of:

| | Parts |
|---|---|
| Methyl methacrylate monomer | 1,164 |
| Glycidyl methacrylate monomer | 36 |
| Azodiisobutyronitrile | 3 |
| Methyl isobutyl ketone | 540 |
| Toluene | 1,260 | to produce a solution containing 40% on a copolymer of molecular weight about 80,000.

Approximately 12% of the epoxide groups in the copolymer were then esterified with gluconic acid by refluxing a mixture of:

| | Parts |
|---|---|
| Copolymer solution (as above) | 1,000 |
| Gluconic acid | 1.6 |
| Dimethyl dodecyl tertiary amine | 1.0 | until the acid value fell below 0.2.

This modified polymer has been found to be a very effective dispersing agent compared with a methyl methacrylate homopolymer or a more conventional methyl methacrylate/methacrylic acid copolymer.

It was possible to disperse 62% more vegetable black pigment in a 70:30 mixture of toluene:methyl isobutyl ketone containing 15% of the modified dispersant referred to above, than in the organic liquid containing 20% of the normal 98:2 methyl methacrylate:methacrylic acid copolymer.

EXAMPLLE 4

A 97:3 methyl methacrylate:glycidyl methacrylate copolymer was prepared according to the method given in Example 3, but instead of esterifying with gluconic acid the copolymer was esterified with an equivalent proportion of 12-hydroxystearic acid.

When a dispersion of vegetable black pigment was prepared by grinding it in a ball mill with a 70:30 mixture of toluene:methyl isobutyl ketone containing 20% of a 98:2 methyl methacrylate:methacrylic acid copolymer, the maximum proportion of pigment which could be satisfactorily dispersed was 6.1% by volume of the dispersion. When the organic liquid contained 20% of the dispersant made as above the vegetable black was satisfactorily dispersed at a pigment volume of 9.9% of the dispersion.

A similar dispersant, prepared by reacting the 97:3 methyl methacrylate:glycidyl methacrylate copolymer with an equivalent amount of stearic acid in place of the 12-hydroxystearic acid, when added in the same amount to the organic liquid, could satisfactorily disperse only 7.0% by volume of the vegetable black.

EXAMPLE 5

A 97:3 methyl methacrylate:glycidyl methacrylate copolymer was prepared according to the method given in Example 3, but instead of esterifying with gluconic acid, the copolymer was esterified with an equivalent proportion of glycollic acid. A further sample of the same copolymer was esterified with an equivalent proportion of acetic acid.

When a dispersion of vegetable black pigment was prepared by grinding it in a ball mill with a 70:30 mixture of toluene: methyl isobutylketone containing 20% of the acetic acid-modified copolymer, the maximum proportion of pigment which could be satisfactorily dispersed was 6.7% by volume of the dispersion. When the organic liquid contained the same amount of the glycollic acid-modified copolymer referred to above, the vegetable black was satisfactorily dispersed at a pigment volume of 10.1% of the dispersion.

EXAMPLE 6

A copolymer dispersant was prepared in the following manner:

Stage 1

|  | Parts |
|---|---|
| Polyhydroxystearic acid (molecular weight about 1500) | 1,100 |
| Aliphatic/aromatic hydrocarbon (boiling range 137° C.–144° C.) | 900 |
| Hydroquinone | 1 |
| Dimethyl dodecyl tertiary amine | 2 |
| Glycidyl methacrylate | 150 |

The mixture was heated with stirring to reflux and maintained at this temperature (about 140° C.) until the acid value of the polymer fell below 1.0. The final solids content of the polymer solution was 47.4%.

Stage 2

A vessel was charged with 420 parts of hydrocarbon (as above) and over a period of 4 hours the following mixture was drip fed into the vessel:

|  | Parts |
|---|---|
| Methyl methacrylate | 164 |
| Polymer solution as prepared in Stage 1 | 145 |
| Glycidyl methacrylate | 10 |
| Azodiisobutyronitrile | 5 |

Throughout this period the temperature was maintained at 85° C.–90° C.

Heating was continued for a further 2 hours at which stage the solids content was 32.9%.

Stage 3

Epoxide groups in the copolymer prepared as described in Stage 2 were esterified with lactic acid by heating to 130° C.–140° C. a mixture of:

|  | Parts |
|---|---|
| Copolymer solution as described in Stage 2 | 500.00 |
| Lactic acid (75% purity) | 4.15 |
| Dimethyl dodecyl tertiary amine | 0.50 | until the acid value had fallen below 0.2.

The product was a solution in organic liquid of a graft copolymer comprising a polymethacrylate chain having attached thereto polyhydroxystearic chains and groups of the above-defined type in which the hydroxyl-substituted aliphatic radical is derived from lactic acid.

Approximately 110% more vegetable black could be dispersed in this organic liquid containing the dispersant than in a corresponding organic liquid containing the copolymer unesterfied with lactic acid.

EXAMPLE 7

A methyl methacrylate:glycidyl methacrylate copolymer made as in Example 3 above was reacted with shellac as follows:

7 parts of dewaxed shellac were dissolved in 26 parts of methanol with gentle heating and stirred into a mixture of:

|  | Parts |
|---|---|
| Copolymer solution | 896 |
| Methyl isobutyl ketone | 70 |
| Dimethyl dodecyl tertiary amine | 1 |

The temperature was gradually raised to 105° C. during which time most of the methanol was removed by distillation. The mixture was held at 105° C.–107° C. until a 10 gm. sample required less than 0.2 ml. of N/10 KOH for neutralisation to phenol phthalein. The product contained about 40% of dissolved solids.

Dispersions of phthalocyanine blue pigment in the product showed greatly improved resistance to flocculation compared with similar dispersions in polymethyl methacrylate solution, when diluted and examined under the microscope. Similarly, blends of dispersions of titanium dioxide and phthalocyanine blue in the dispersants showed only slight separation of pigments when stored for long periods in glass tubes.

Pastel blue paints made from mixtures of titanium dioxide and phthalocyanine blue dispersions in the dispersants gave very good colour development when applied under conditions of low shear. Increase in application shear made little difference to the colour of the paint.

The dispersions described in the above examples illustrate uses and advantages of a selection of the dispersants of this invention which may, of course, be used in dispersions of many materials other than the pigments used by way of illustration.

Pigment dispersions as exemplified above are of particular value in paint compositions and as has been explained, they are used to the best advantage when the dispersant is compatible with the film-forming material in the dry paint film as indicated in the following table:

| Example | Polymer chain | Suitable type of paint |
|---|---|---|
| 1 and 2 | Hydrocarbon-soluble acrylic polymer | Alkyd paint or P.V.C. dispersion paint. |
| 3, 4, 5 and 7 | Acrylic polymer | Acrylic lacquers. |
| 6 | Poly(OH-stearic acid)-modified acrylic polymer | Thermosetting acrylic lacquers. |

We claim:

1. A paint composition comprising an organic liquid containing dissolved or dispersed therein a film-forming material, a pigment which is insoluble in said organic liquid and dispersed therein, and 0.1 to 200% by weight of the pigment of a dispersant for said pigment, said dispersant being soluble in said organic liquid and having the formula:

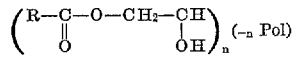

where R is an aliphatic radical which contains at least one hydroxyl group, Pol is an addition polymer chain which is solvated by said organic liquid and $n$ is the number of groups having the formula

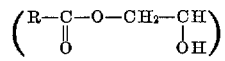

attached to said polymer Pol and is at least one.

2. A paint composition as set forth in claim 1 in which said addition polymer is a random copolymer.

3. A paint composition as set forth in claim 1 in which said addition polymer is a member of the group consisting of block and graft copolymers and said dispersant contains more than one group having the formula

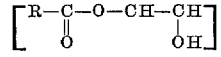

attached to one segment of said member of the group consisting of block and graft copolymers.

4. A paint composition as claimed in claim 1 in which the residue having the formula $$R-\underset{\underset{O}{\|}}{C}$$

is the residue of a polyhydroxy-substituted aliphatic acid.

5. A paint composition as claimed in claim 1 in which the residue having the formula $$R-\underset{\underset{O}{\|}}{C}$$

is the residue of shellac.

References Cited

UNITED STATES PATENTS

| 2,857,354 | 10/1958 | Fang. | |
|---|---|---|---|
| 3,058,947 | 10/1962 | Fryling et al. | 260—32.8 |
| 3,269,966 | 8/1966 | Brack. | |
| 3,293,325 | 12/1966 | McEwan | 260—32.8 |

ALLAN LIEBERMAN, Primary Examiner

H. H. FLETCHER, Assistant Examiner

U.S. Cl. X.R.

252—356; 260—29.1, 32.8, 33.4, 33.6, 34.2, 41, 41.5, 851, 873, 901